UNITED STATES PATENT OFFICE.

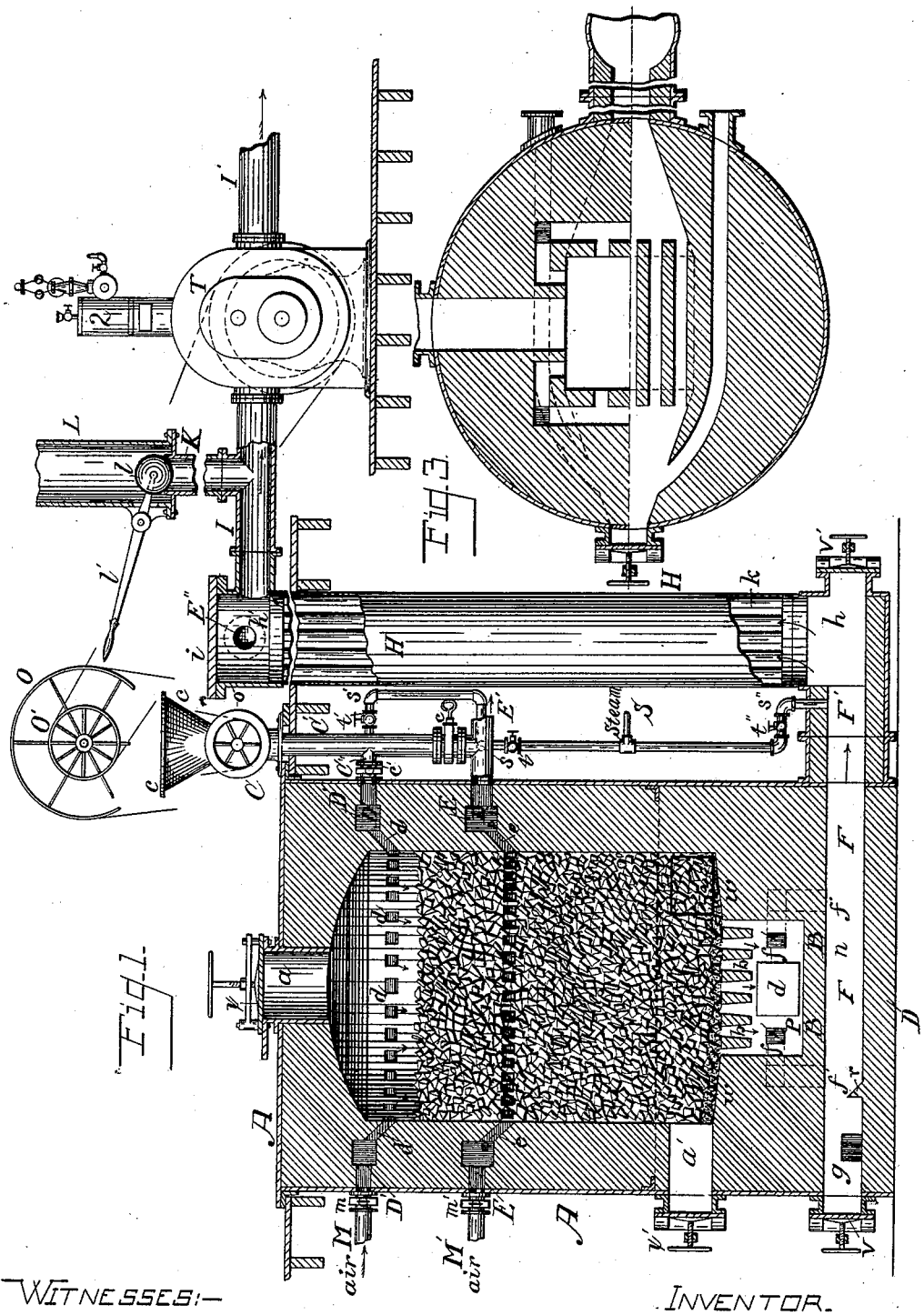

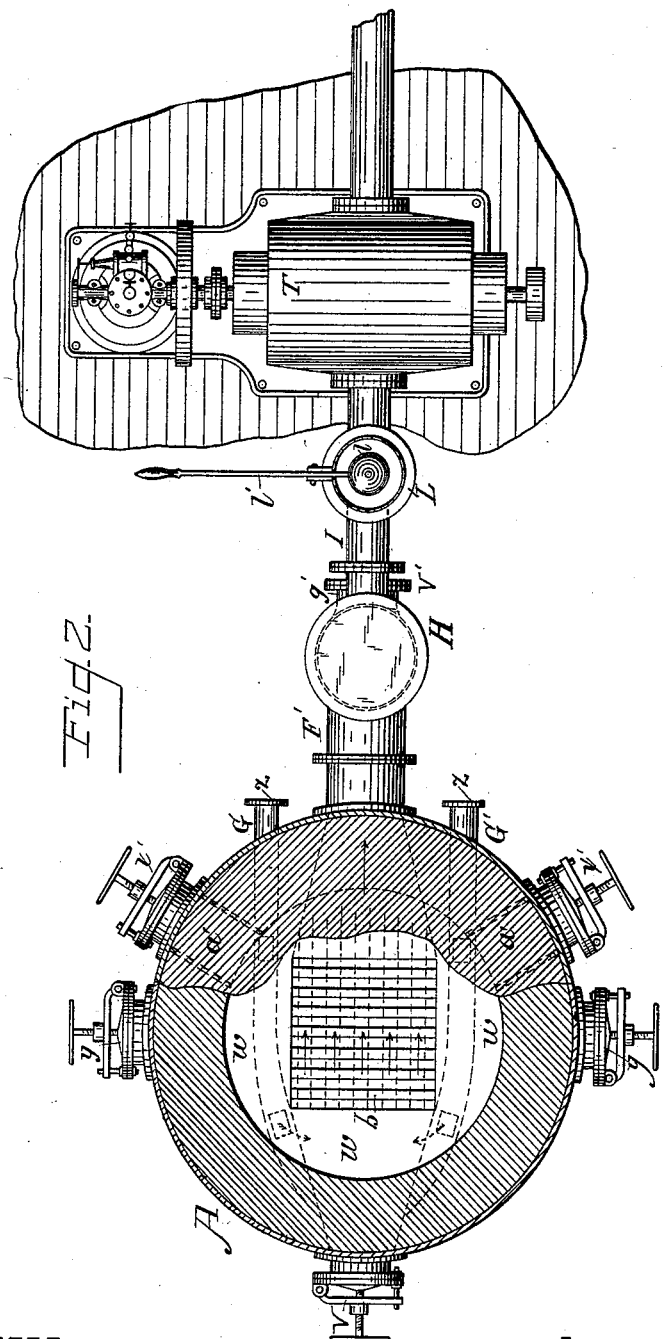

BURDETT LOOMIS, OF HARTFORD, CONNECTICUT.

APPARATUS FOR THE MANUFACTURE OF GAS.

SPECIFICATION forming part of Letters Patent No. 404,208, dated May 28, 1889.

Application filed April 25, 1888. Serial No. 271,792. (No model.)

*To all whom it may concern:*

Be it known that I, BURDETT LOOMIS, a citizen of the United States, residing at Hartford, in the county of Hartford and State of Connecticut, have invented certain new and useful Improvements in Apparatus for the Manufacture of Gas; and I do hereby declare the following to be a full, clear, and exact description of the invention, such as will enable others skilled in the art to which it appertains to make and use the same.

This invention relates to an apparatus for the manufacture of fuel-gas adapted for heating glass-furnaces, pottery-kilns, metallurgic and other furnaces, and for motive power in gas-engines.

In the manufacture of gas as heretofore produced much trouble has arisen during the application of the air blast or draft either up or down through the generator on account of the air-currents passing through channels along the walls of the generator or between the body of fuel and the generator-walls and escaping without causing proper and uniform combustion of the fuel. The fuel was thus burned and gasified quite unevenly, and the gases and vapors escaped through the channels without proper contact with the incandescent fuel, and thus passed off in an unfixed condition. Channels thus formed along the furnace-walls also permitted steam to pass through the generator without being brought into proper contact with the incandescent fuel, and consequently escaping without decomposition.

The object of my invention is to overcome these difficulties and to cause the draft or current of air or steam to pass uniformly through the body of fuel and away from the side walls, especially in a generator operated with a downdraft of air, and in which an exhauster is used for drawing in the air to the upper portion of the fuel and drawing off the gaseous products from the lower portion thereof.

Another object is to provide means—such as a catch-basin—for trapping the dust and ashes, and suitable flues below the ash-pit for removing dust and ashes and for superheating steam on its passage up into the fuel.

In carrying out my invention I provide the generating-furnace with a central grate-opening of small area as compared with the horizontal area of the fuel-chamber, and provide means for passing the gaseous products from the ash-pit into the large flue below it connected with the exhauster, whereby the air is drawn in at the top of the body of the fuel, and the resulting gaseous products will be drawn through the fuel toward its central portion at the base of the generator, and thus drawn away from the side walls, so that the formation of channels along the walls is prevented. I also provide a tubular water-chamber suitably connected to the gas-outlet flue at the bottom of the generator on the one side and with the exhauster on the other side. It is provided with means for circulating water through it, and acts as a cooler for the gas passed through its tubes, so that the exhauster may not be injured by heat of the passing gas, as would occur if the gas were passed directly from the generator to the exhauster. This tubular water-chamber also acts as a steam-boiler, since the gas may be sufficiently hot to boil the water. Coal is pulverized by a suitable grinding-mill and blown in at the top of the generating-chamber through a suitable flue and ports and discharged upon the top of the body of fuel, or it may be blown into the fuel through a flue and ports some distance below its top.

In the accompanying drawings, Figure 1 represents a vertical longitudinal section, partly in elevation, of a generator, steam-boiler, exhauster, and connecting-pipes. Fig. 2 represents a horizontal section (on different planes) of the generator and the top plan view of the boiler and exhauster. Fig. 3 represents a horizontal section partly on the line $x\, x$ through the ash-pit and partly on the line $y\, y$ through bottom flues.

The generator A is built of brick, having a lining of fire-brick, and is covered by an outer iron jacket in the usual manner. It is provided at the top with fuel-opening $a$, closed by lid $x$, and near the bottom is provided with three openings, $a'$, leading into the fuel-chamber and provided with lids $x'$. The lower end of the fuel-chamber is constructed with an inwardly-extending circumferential solid brick hearth, $w$, slightly inclined from the vertical wall down to the central opening, in which is placed the grate $b$, while the ash-pit P is of the same horizontal dimensions as the grate-opening, and is provided with a brick or tile bottom, B, which is supported upon the parallel division-walls $n$, built in the outlet-flue F. A closed brick bottom or foundation, D, is constructed at the base of the generator, and in this bottom or foundation is formed the flue F, which may be about the width of the ash-pit at its middle portion and drawn in at the outlet-openings. The take-off pipe F' connects the flue F with the smoke-box $h$ at the base of the tubular water-chamber H. A passage, $u$, leads from the opposite end of flue F through the wall, and is provided externally with lid $v$, and a passage, $u'$, leads from the smoke-box $h$ and is provided with lid $v'$. These passages and lids are for the removal of dust and ashes. Passages $d$ lead from the ash-pit P and are closed externally by lids $y$. Flues G and G', having lids $z$, extend through the brick-work on each side of the flue F, and are connected therewith by ports $g$. They are also connected with the ash-pit by vertical passages $f'$ and ports $f$, so that the gaseous products may be passed from the ash-pit through ports $f$, passages $f'$, flues G and G', and ports $g$ into flue F. The hot gaseous products in passing off through flue F heat the brick division-walls $n$. The circuitous course of the hot gaseous products through the ports and flues also causes a large extent of brick-work to be highly heated, and this heat is subsequently utilized for superheating steam, which is passed into the base of the generator. The division-walls $n$ divide up the large flue F into numerous passages and serve for supporting the floor B of the ash-pit. A deflecting-bridge, $r$, rises from the floor of flue F in front of ports $g$, so as to obstruct the dust carried by outgoing gas and cause much of it to deposit near the cleaning-door $v$.

In the wall of the generator near its top is formed an annular flue, D', which is connected by ports or tuyeres $d$ with the interior of the generator. At about half the height of the fuel-chamber, or a little above, an annular flue, E, is formed in the wall and connects by ports or tuyeres $e$ with the interior of the generator. An air-supply pipe, M, having a valve, $m$, connects with flue D', and a second air-supply pipe, M', having a valve, $m'$, connects with the flue E. A coal-pulverizing mill, C, provided with hopper $c$, is conveniently located above the generator and connects by pipe C' and short branches provided with valves with flues D' and E, so that pulverized fuel can be fed into the generator either by blast or steam. A steam-supply pipe, S, connects by branch $s$, having a valve, $t$, with pipe E', by branch $s'$, having a valve, $t'$, with pipe C', opposite the opening of the branch by pipe C'', which leads into flue D'. Pipes C' and C'' are provided with valves $c$ and $c'$, for controlling the supply of carbon dust to either flue D' or E. A branch steam-pipe, S'', having valve $t''$, connects with pipe F' at the base of the generator. The coal-pulverizer is provided with belt-wheel $o$, which is connected by a belt with a large belt-wheel, O, mounted upon a suitable shaft above the generator. A smaller belt-wheel, O', is mounted upon the same shaft with wheel O, and is connected by a belt with a wheel upon the shaft of the exhauster T. The vertical tubular water-chamber H is provided with smoke-boxes $h$ and $h'$, respectively, at the bottom and top thereof, and with tubes $k$, extending between such boxes. The box $h'$ is closed at the top with a plate, $i$, secured to its flange by rivets or screw-bolts. An outlet-pipe, E'', for water-gas leads from box $h'$. Pipe I for producer-gas also leads from box $h'$ to exhauster T, and is provided with upwardly-extending branch pipe K, projecting into smoke-stack L. A ball-valve, $l$, is fitted to the top of pipe K, and is provided with a suitable lever or pivoted handle, $l'$. Pipe I' leads from the exhauster to the storage-holder or any furnace for immediate use. Engine 2 drives the exhauster, and also, through the medium of suitable belts and pulleys, operates the coal-pulverizer C. Discharge-pipes E' and E'' may connect with an exhauster for drawing off water-gas, if desired.

The tubular water-chamber performs an important office in cooling the gas passed through its tubes, so that the exhauster may not be injured by heat of the gas when passed through it.

With the water-chamber arranged as shown I am enabled to run the exhauster continuously without injury, and this is of the greatest importance where the gas is consumed as fast as generated, as often occurs in manufacturing-works.

The dust and ashes which collect in the lateral flues G G' are pushed forward through ports $g$ $g$ into the front end of central flue, F, from which they are removed through opening $u$. The small amount of dust and ashes which is carried by the gas escaping from ports $g$ over bridge $r$ into flue F is blown by the steam, when admitted by pipe $s''$, back over the bridge toward cleaning-opening $u$ for convenient removal. By means of the circuitous passages and flues described the dust and ashes are well removed from the gas before it reaches boiler H.

The operation is as follows: A fire is first kindled upon the grate and allowed to burn by natural draft, the lid $x$ of passage $a$ being for that purpose left open. Fuel—such as coke or coal-slack—is gradually supplied, and when it is well ignited the lid $x$ is closed and the ball-valve $l$ in stack L is opened. Air is now admitted by pipe M, flue D, and ports $d$, and combustion of the fuel is caused by downdraft. Fresh fuel is periodically added until a deep bed thereof is well ignited. As soon as good combustible producer-gas is given off in the fuel ball-valve $l$ is closed, the exhauster is started, and the producer-gas is drawn off from the body of fuel down into the ash-pit P, through ports *f*, passages *f'*, flues G and G', ports *g*, flue F, and the tubes of the boiler and delivered by the exhauster and its outlet-pipe I' to the place of immediate use. During the operation of the exhauster for drawing off producer-gas air may be supplied through pipe M', flue E, and ports *e*, so as to enter below the surface of the fuel, if desired. Pulverized fuel may at the same time be fed from the pulverizer through pipe C', flue D', and discharged through ports *d* upon the surface of the fuel in the generator. Pulverized fuel may also be blown into the body of the fuel through flue E and ports *e*. When supplying pulverized fuel through flue D', a jet of steam may be admitted by pipes *s'*, so as to discharge into the outer end of pipe C'', and thereby blow the fuel into flue D'. In like manner a jet of steam may be used for blowing pulverized fuel into flue E and discharging it through ports *e*. Since the generator is provided with a solid hearth or floor extending some distance in from its entire circumference, and as its grate-opening is centrally arranged, air for causing combustion of the fuel and generation of the gas is drawn from the side walls, where it is admitted at the top toward the central portion of the body of fuel, and the resulting gaseous products are drawn off at the base through the central grate-opening, thus preventing the air and gases from passing down other channels along the walls of the generator and escaping without proper action upon the fuel. More even and effective combustion is thus produced and a better quality of gas is generated. A deep body of fuel having been heated to incandescence when it is desired to make water-gas, the exhauster T is stopped, valves in the air-pipes closed, and steam is admitted by valves *t''* and branch pipe *s''* into pipe F', or directly into flue F, and passed through the spaces between division-walls *n*, wherein it is highly heated, and is then conducted through ports *g*, flues G G', passages *f'*, and ports *f* into the ash-pit, from which it passes up into the central portion of the body of fuel, where it is decomposed into hydrogen and carbonic oxide. These gases pass off through ports *e* into flue E some distance below the top of the fuel. At the same time that steam is being decomposed fresh fuel—such as bituminous coal in the form of lump or dust—is being distilled in contact with the highly-heated fuel, and the resulting gases and vapors are passed downward in contact with the heated fuel, whereby they are converted into fixed carbureted-hydrogen gas, which mingles with the water-gas and passes with it through ports *e*, flue E, and off through pipe E' to the washer or scrubber. The water-gas is enriched and its volume largely increased by the carbureted hydrogen distilled from the fresh coal. The steam admitted into flue F is heated by contact with the partition-walls *n* and by passage through the heated flues leading into the ash-pit, so that it is more readily decomposed in the bed of incandescent fuel. In the event of the bed of fuel becoming somewhat deadened at the grate by admitting steam at that portion, valve *t''* may be closed and valve *t* opened, so as to supply the steam to pipe *s*, flue E, and ports *e* into the upper portion of the fuel. It is then decomposed by passage down through the fuel, and the resulting gas is passed from the ash-pit into flue F and up through the tubular boiler and escapes by pipe E'', leading from smoke-box *h'*. The direction of the currents of steam and the resulting gas may thus be at any time reversed and the heat of the fuel and gas take-off pipes proper be utilized and controlled.

Having described my invention, what I claim, and desire to secure by Letters Patent, is—

1. A gas-generator having a closed circumferential hearth and a central grate-opening, in combination with an exhauster connecting by suitable flues with the central grate-opening, for the purpose described.

2. A downdraft generator having an air-supply pipe connecting with its top, and a closed circumferential hearth having a central opening and ash-pit, in combination with the exhauster connecting with such central ash-pit, whereby the air-draft and gaseous products are drawn away from the side walls of the furnace and more evenly through the body of fuel, for the purpose described.

3. A gas-generator having an air-supply pipe or opening at its top above the fuel and an outlet-pipe leading from its bottom, in combination with a cooler connecting with such outlet-pipe and an exhauster connecting with the cooler for drawing air down into the fuel and the resulting gases out from the bottom of the generator and through the cooler, as and for the purpose described.

4. A gas-generating furnace having a contracted grate-opening and ash-pit at the base thereof, a wide flue arranged below the ash-pit, and connecting flues and ports constructed in the brick-work, for the purpose described.

5. In combination with the ash-pit of a furnace, the wide central flue placed below it, and division-walls constructed in such flue for supporting the floor of the ash-pit and forming a steam-heating surface.

6. In combination with the ash-pit of a furnace, a central flue formed below it and containing supports for the ash-pit floor, and lateral flues opening by ports into the central flue and connecting with the ash-pit, for the purpose described.

7. In combination with the ash-pit of a furnace, a flue arranged below it, one or more lateral flues leading from the ash-pit and opening at one end into the flue below, and the deflecting-bridge $r$, arranged in the path of the gas in such flue for arresting dust and ashes.

8. A gas-generating furnace having a contracted grate-opening and ash-pit at the base thereof, a wide central flue arranged below the ash-pit, lateral flues G G', having ports $g$ formed in the foundation-walls, passages $f'$, having ports $f$ leading therefrom into the ash-pit, and outlet-pipe leading from flue F, for the purpose described.

In testimony whereof I affix my signature in presence of two witnesses.

BURDETT LOOMIS.

Witnesses:
E. B. CLARK,
LUCRETIA M. LOOMIS.